(12) United States Patent
Kondo et al.

(10) Patent No.: US 12,404,028 B2
(45) Date of Patent: Sep. 2, 2025

(54) VEHICLE SEAT

(71) Applicant: TOYOTA BOSHOKU KABUSHIKI KAISHA, Aichi-ken (JP)

(72) Inventors: Shuhei Kondo, Aichi-ken (JP); Yuji Dobashi, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 248 days.

(21) Appl. No.: 18/200,016

(22) Filed: May 22, 2023

(65) Prior Publication Data

US 2023/0406512 A1  Dec. 21, 2023

(30) Foreign Application Priority Data

May 31, 2022  (JP) .................................. 2022-088358

(51) Int. Cl.
*B64D 11/06* (2006.01)

(52) U.S. Cl.
CPC ................................ *B64D 11/0644* (2014.12)

(58) Field of Classification Search
CPC .................................................. B64D 11/0644
See application file for complete search history.

(56) References Cited

U.S. PATENT DOCUMENTS

| | | | |
|---|---|---|---|
| 8,534,761 B2 * | 9/2013 | Saxton | B64D 11/0646 297/DIG. 2 |
| 2011/0272991 A1 | 11/2011 | Saxton | |
| 2020/0247546 A1 * | 8/2020 | Wong | B64D 11/0648 |

FOREIGN PATENT DOCUMENTS

| | | | |
|---|---|---|---|
| DE | 102021119323 A1 * | 1/2023 | |
| JP | 2013-526447 A | 6/2013 | |
| WO | WO-2017108538 A1 * | 6/2017 | B64D 11/0644 |

* cited by examiner

*Primary Examiner* — Anthony D Barfield
(74) *Attorney, Agent, or Firm* — GREENBLUM & BERNSTEIN, P.L.C.

(57) ABSTRACT

A vehicle seat includes a seat cushion, a seat back, an armrest provided on a lateral side of the seat back and extending in a front-rear direction of the vehicle seat, a support member supporting the armrest, and a cover member covering the support member from a lateral side of the vehicle seat. The support member includes a side portion and a connecting portion connecting a rear end portion of the side portion and a rear end portion of the armrest, and a pivot shaft attachment portion is formed on a part of the connecting portion. The cover member includes an upper cover portion and a lower cover portion, and the upper cover portion and the lower cover portion are attached to the support member in a state where a substantially smooth surface is exposed.

4 Claims, 6 Drawing Sheets

VEHICLE SEAT

CROSS REFERENCE TO THE RELATED APPLICATION

This application is based on Japanese Patent Applications No. 2022-088358 filed on May 31, 2022, the entire contents of which are incorporated herein by reference.

TECHNICAL FIELD

The present invention relates to a vehicle seat. Specifically, the present invention relates to an aircraft seat provided with an armrest.

BACKGROUND ART

In the related art, in an aircraft seat in which a plurality of seats are arranged in a horizontal row, an armrest is disposed on a side surface of a seat at an end of the row by being supported by a support member. In an aircraft seat described in JP2013-526447A, a decorative cover made of a molded plastic or a similar material is attached to a side surface of a support member to improve an appearance.

SUMMARY

In the aircraft seat described in JP2013-526447A, since the support member is formed only to maintain a structural strength thereof without considering the appearance, the decorative cover is attached to cover the entire support member to improve the appearance. Accordingly, there is a problem that the decorative cover increases in size and weight, and a material cost increases.

In view of such a problem, an object of the present invention is to provide an aircraft seat in which deterioration of an appearance is prevented and a cover member covering a support member supporting an armrest is reduced in size.

A first aspect of the present invention is a vehicle seat including: a seat cushion; a seat back; an armrest provided on a lateral side of the seat back and extending in a front-rear direction; a support member supporting the armrest; and a cover member covering the support member from a lateral side. The support member includes a side portion extending in a front-rear direction along the lateral side of the seat cushion, and a connecting portion connecting a rear end portion of the side portion and a rear end portion of the armrest, and a pivot shaft attachment portion for attaching a pivot shaft supporting the seat back to be pivotable in a front-rear direction and extending in a left-right direction is formed on a part of the connecting portion in an upper-lower direction. The cover member includes an upper cover portion above the pivot shaft attachment portion and a lower cover portion below the pivot shaft attachment portion, and the upper cover portion and the lower cover portion are attached to the support member in a state where a lateral side of the pivot shaft attachment portion having a substantially smooth surface is exposed to an outside.

According to the first aspect, the support member is covered with the cover member in the state where the lateral side of the pivot shaft attachment portion having the substantially smooth surface is exposed to the outside. This is because the lateral side of the pivot shaft attachment portion of the support member has the substantially smooth surface, so that there is almost no possibility that an appearance is deteriorated even when the side is exposed without being covered with the cover member. Accordingly, the cover member can eliminate a portion covering the lateral side of the pivot shaft attachment portion, and thus the cover member can be reduced in size, and a seat weight can be reduced. Here, the term "substantially smooth" is intended to include not only a completely smooth state but also a state in which slight irregularities are formed, such as a case in which a grain pattern or the like is formed.

A second aspect of the present invention is the above first aspect, in which in the support member except for the pivot shaft attachment portion, a recess is formed on a surface opposite to the upper cover portion and the lower cover portion, and a cable configured to adjust an inclination of the seat back is accommodated in the recess.

According to the second aspect, the cable is accommodated in the recess formed on the surface of the support member opposite to the upper cover portion and the lower cover portion, and thus the cable is less likely to be seen from the outside, and the deterioration of the appearance can be prevented.

A third aspect of the present invention is the above second aspect, in which a part of the cable accommodated in the recess is covered with a cable case.

According to the third aspect, even if a part of the cable is exposed to the outside, the part of the cable is covered with the cable case, and thus the deterioration of the appearance can be further prevented.

DESCRIPTION OF EMBODIMENTS

Figure 1:
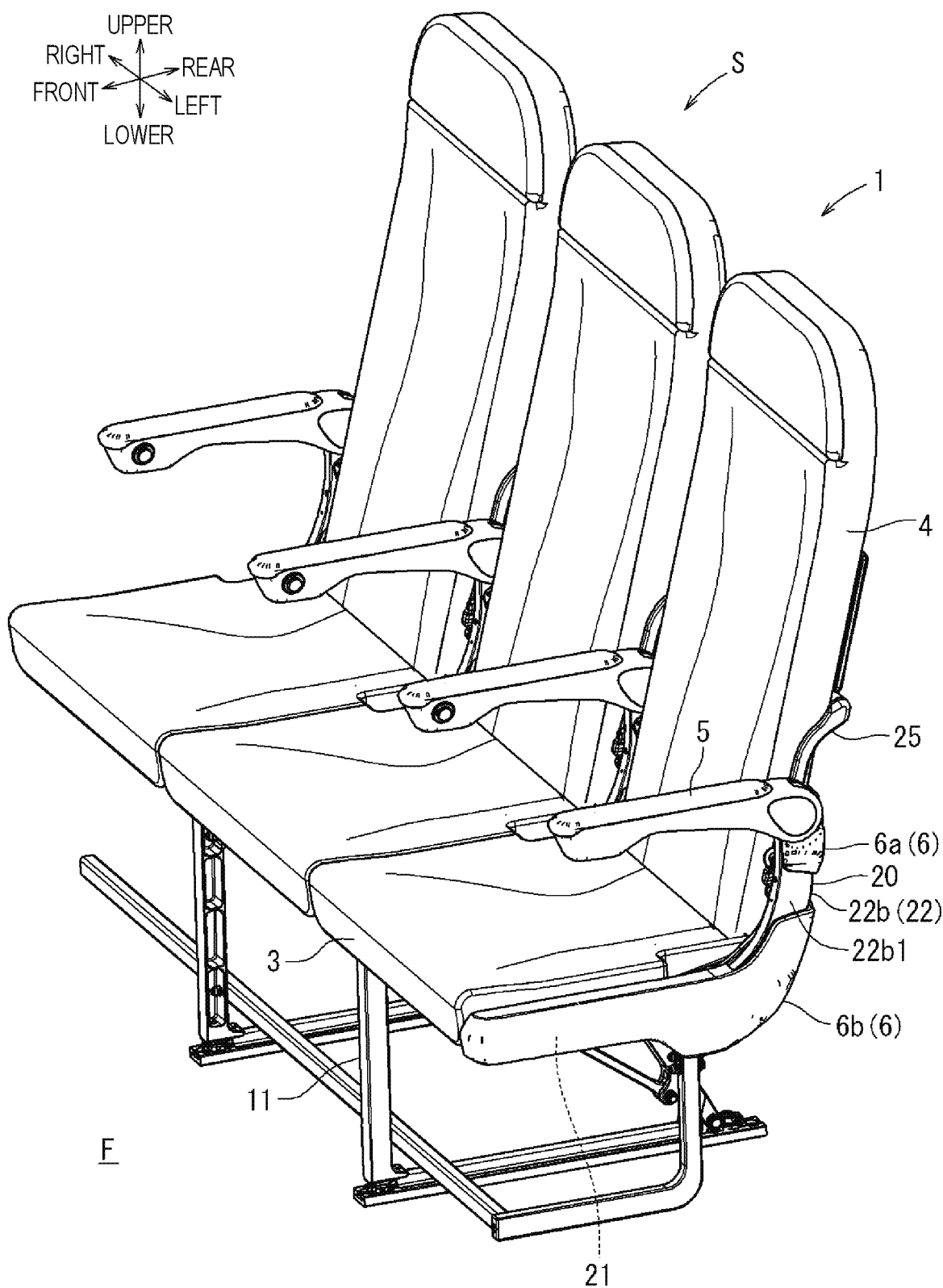
FIG. 1 is a perspective view of an aircraft seat according to an embodiment of the present invention.

An aircraft seat 1 according to an embodiment of the present invention will be described with reference to FIGS. 1 to 6. The aircraft seat 1 is a seat at a left end portion of an aircraft seat S in which three seats are arranged in a horizontal row in a left-right direction. In the drawings, arrows indicate respective directions when the aircraft seat S is attached to a floor F of an aircraft. In the following description, descriptions on directions are made with reference to these directions. The left-right direction corresponds to a seat width direction. Here, the aircraft seat 1 corresponds to a "vehicle seat".

Figure 2:
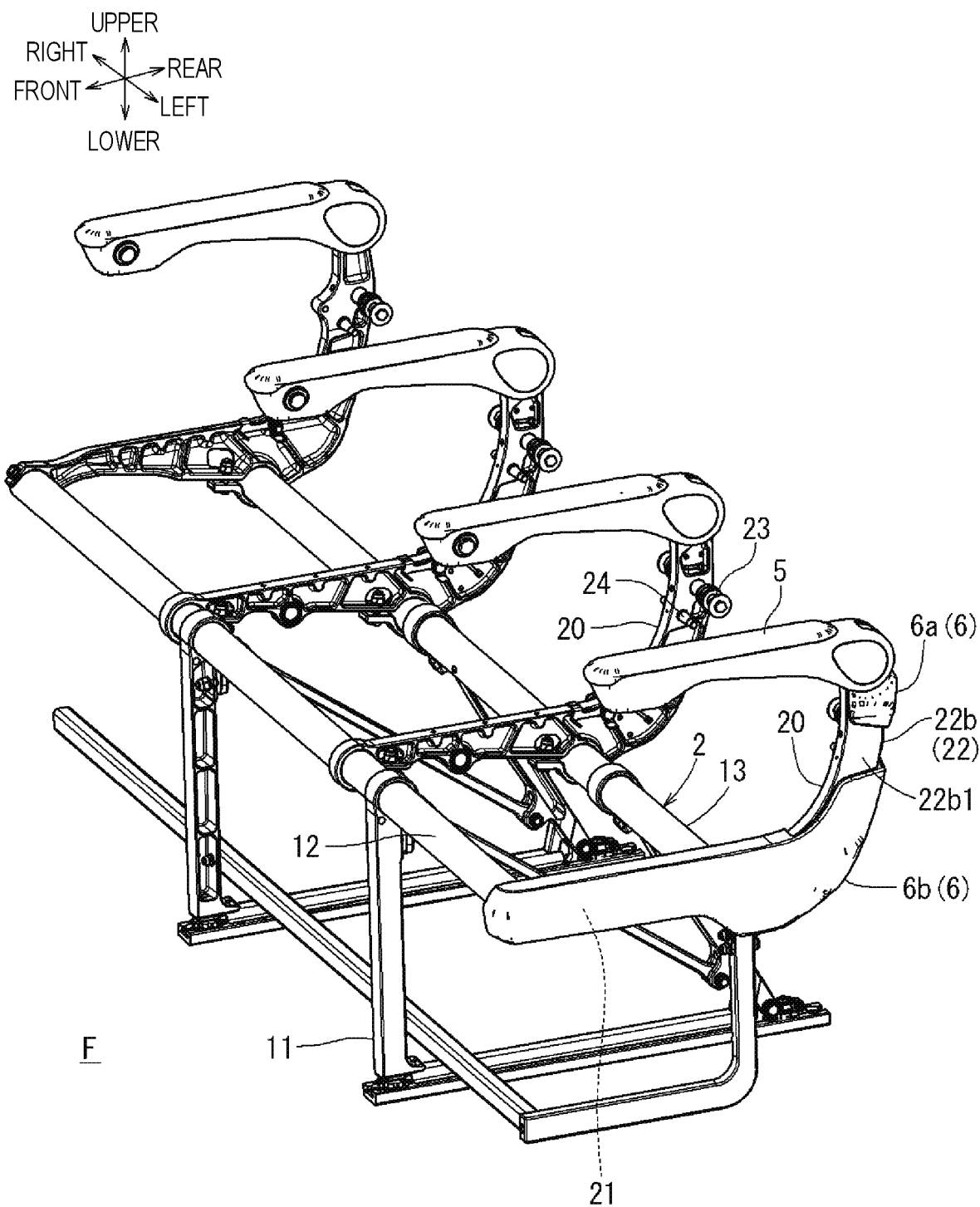
FIG. 2 is a perspective view of the aircraft seat according to the above embodiment when viewed from an outer side in a state where a seat cushion and a seat back are removed.

As shown in FIGS. 1 and 2, the aircraft seat 1 includes a seat frame 2 that forms a skeleton, a seat cushion 3 that is supported by the seat frame 2 to support buttocks and thighs of a seated occupant, and a seat back 4 that is supported by the seat frame 2 to support a waist and a back of the seated occupant. Further, the aircraft seat 1 includes an armrest 5 for supporting an arm of the seated occupant, and a cover member 6 that covers a part of a lateral side of the seat frame 2.

Figure 3:
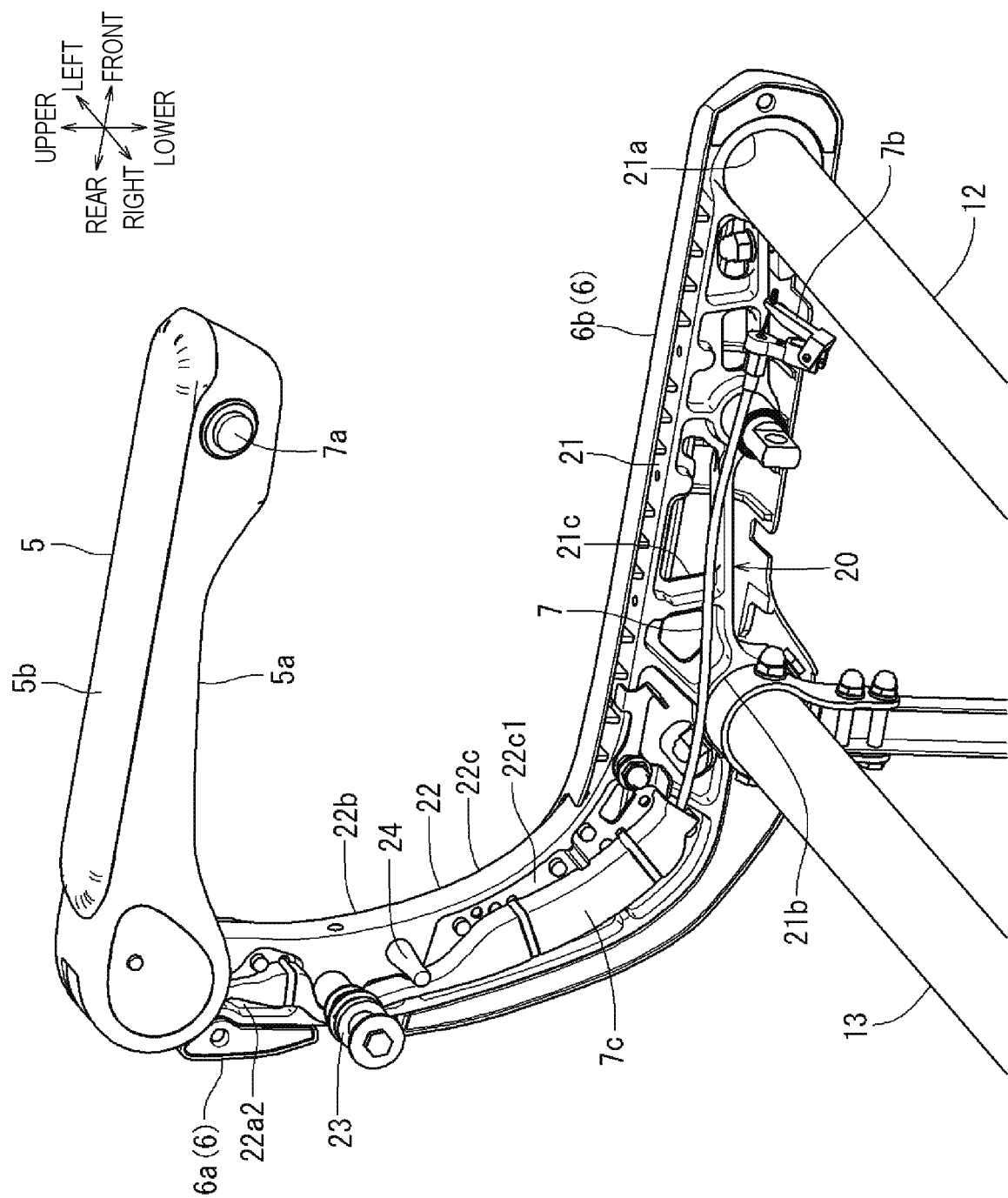
FIG. 3 is a perspective view of the aircraft seat according to the above embodiment when viewed from an inner side in the state where the seat cushion and the seat back are removed.

As shown in FIGS. 1 to 3, the seat frame 2 forming the skeleton of the aircraft seat S includes a front pipe 12 and a rear pipe 13 that extend in the left-right direction and are supported by two sets of legs 11 so as to be separated from the floor F in an upward direction. The front pipe 12 and the rear pipe 13 are connected by four support members 20 arranged at predetermined intervals in the left-right direction so as to extend in parallel with each other at predetermined intervals in a front-rear direction. The seat cushion 3 is disposed in a bridging manner on the front pipe 12 and the rear pipe 13 between every two support members 20. The seat cushion 3 has a structure in which a pad body as a cushioning member is placed on a plate-shaped pan frame forming a skeleton and covered with a fabric cover from above.

As shown in FIGS. 3 to 6, the support member 20 is a member made of light alloy and having a substantially L-shape when viewed from the left-right direction, and includes a side portion 21 extending in a front-rear direction and a connecting portion 22 rising upward from a rear end portion of the side portion 21. A front fixing portion 21a fixed to the front pipe 12 is formed on a front end portion side of the side portion 21, and a rear fixing portion 21b fixed to the rear pipe 13 is formed on a rear end portion side of the side portion 21. The side portion 21 is formed with a plurality of lightening holes 21c penetrating in a left-right direction for lightening.

As shown in FIGS. 3 to 6, an armrest attachment portion 22a is formed on an upper end portion side of the connecting portion 22. A shaft hole 22a1 through which a pivot shaft of the armrest passes is formed through the armrest attachment portion 22a in the left-right direction. An upper cable arrangement hole 22a2 extending in an upper-lower direction and opening rightward (inward in the seat width direction) is formed in the armrest attachment portion 22a. Here, the upper cable arrangement hole 22a2 corresponds to a "recess".

At a position slightly above a center of the connecting portion 22 in an upper-lower direction and below the armrest attachment portion 22a, a seat back pivot shaft attachment portion 22b is formed in a substantially prismatic shape extending in an upper-lower direction and having a solid horizontal cross section and a rectangular cross section whose longitudinal direction is a front-rear direction. An outer side surface 22b1 which is a left side surface (outer side surface in the seat width direction) of the seat back pivot shaft attachment portion 22b is formed smoothly. A pivot shaft hole 22b2 for attaching a seat back pivot shaft 23, a stopper pin hole 22b3, and a lightening hole 22b4 are formed in a right side surface (inner side surface in the seat width direction) of the seat back pivot shaft attachment portion 22b. The pivot shaft hole 22b2 and the stopper pin hole 22b3 each have a columnar shape with an extending direction of a center axis thereof as a left-right direction. The lightening hole 22b4 has a substantially prismatic shape with an extending direction of a center axis thereof as a left-right direction. All of the pivot shaft hole 22b2, the stopper pin hole 22b3, and the lightening hole 22b4 are bottomed holes, and thus the outer side surface 22b1 of the seat back pivot shaft attachment portion 22b is a smooth surface. The stopper pin hole 22b3 is for attaching a pin 24 for restricting pivot of a table support arm 25 (see FIG. 1) which pivots about the seat back pivot shaft 23. Here, the seat back pivot shaft attachment portion 22b and the outer side surface 22b1 correspond to a "pivot shaft attachment portion" and a "lateral side of the pivot shaft attachment portion", respectively.

Lower cable arrangement holes 22c1 extending in an upper-lower direction and opening rightward (inward in the seat width direction) are formed in a lower side portion 22c of the connecting portion 22, which is a lower side portion with respect to the seat back pivot shaft attachment portion 22b. The lower cable arrangement hole 22c1 is a bottomed hole, but a plurality of through holes 22c2 are formed in a bottom surface portion as lightening holes, and a left side surface of the lower side portion 22c (outer side surface in the seat width direction) is not a smooth surface. Here, the lower cable arrangement hole 22c1 corresponds to the "recess".

As shown in FIGS. 3 to 6, the armrest 5 includes a main body portion 5a extending in a front-rear direction and having an upper opening, and a lid body 5b attached from above so as to close the opening of the main body portion 5a. A button hole 5a1 for disposing an operation button 7a of a cable device 7 is formed in a front right side of the main body portion 5a. The lid body 5b is formed such that an upper surface portion thereof has a cushioning feeling, and can support the arm of the seated occupant with a good feeling. The armrest 5 is rotatable in an upper-lower direction with respect to the support member 20 by inserting a rotation shaft (not shown) extending in a left-right direction into the shaft hole 22a1 of the support member 20. The armrest 5 is configured to facilitate seating of the occupant when the armrest 5 is rotated upward to be in a state along a side surface of the seat back 4, and to support the arm of the seated occupant when the armrest 5 is rotated to be in a horizontal state.

Figure 4:
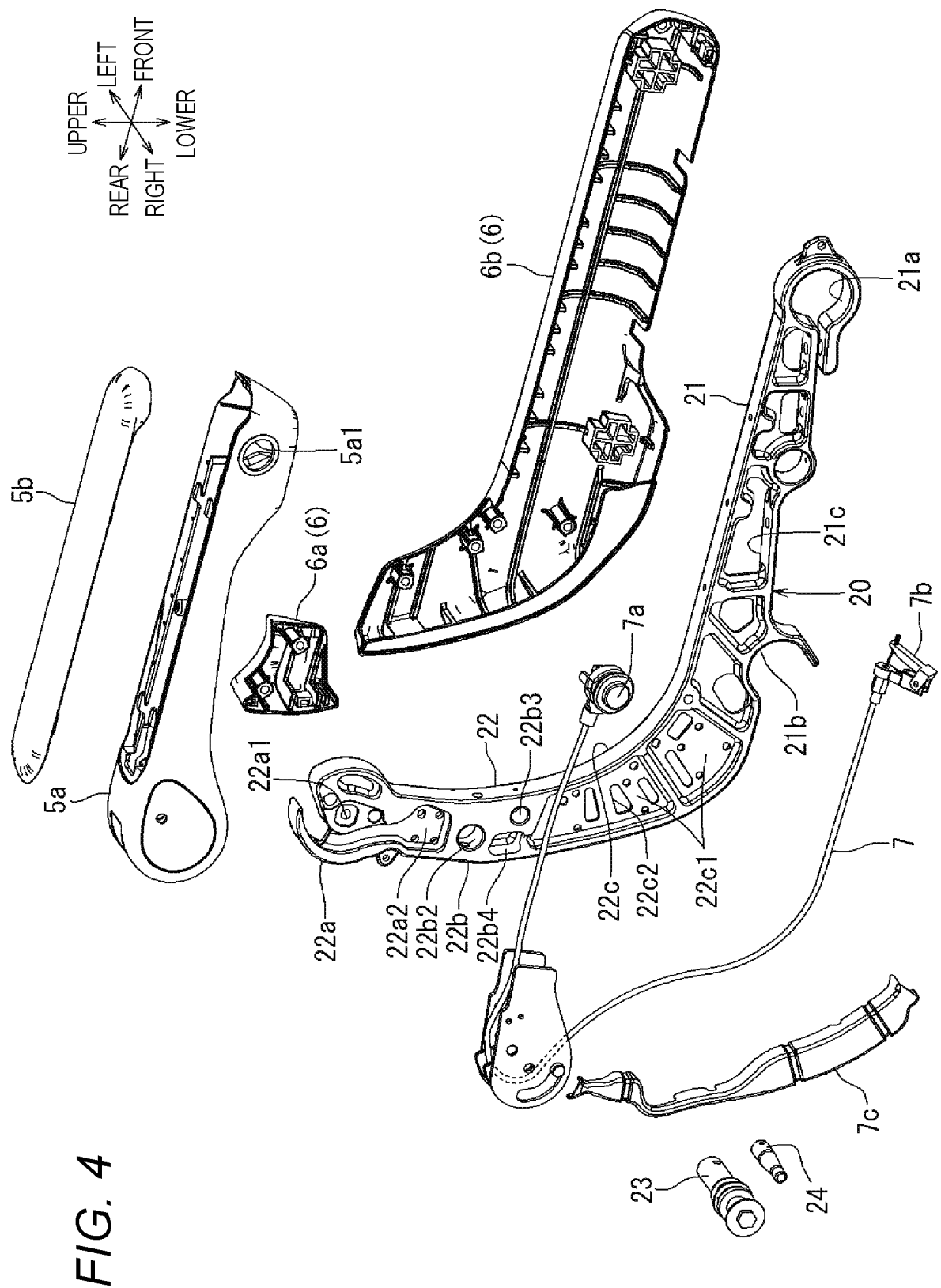
FIG. 4 is an exploded perspective view of FIG. 3.
Figure 5:
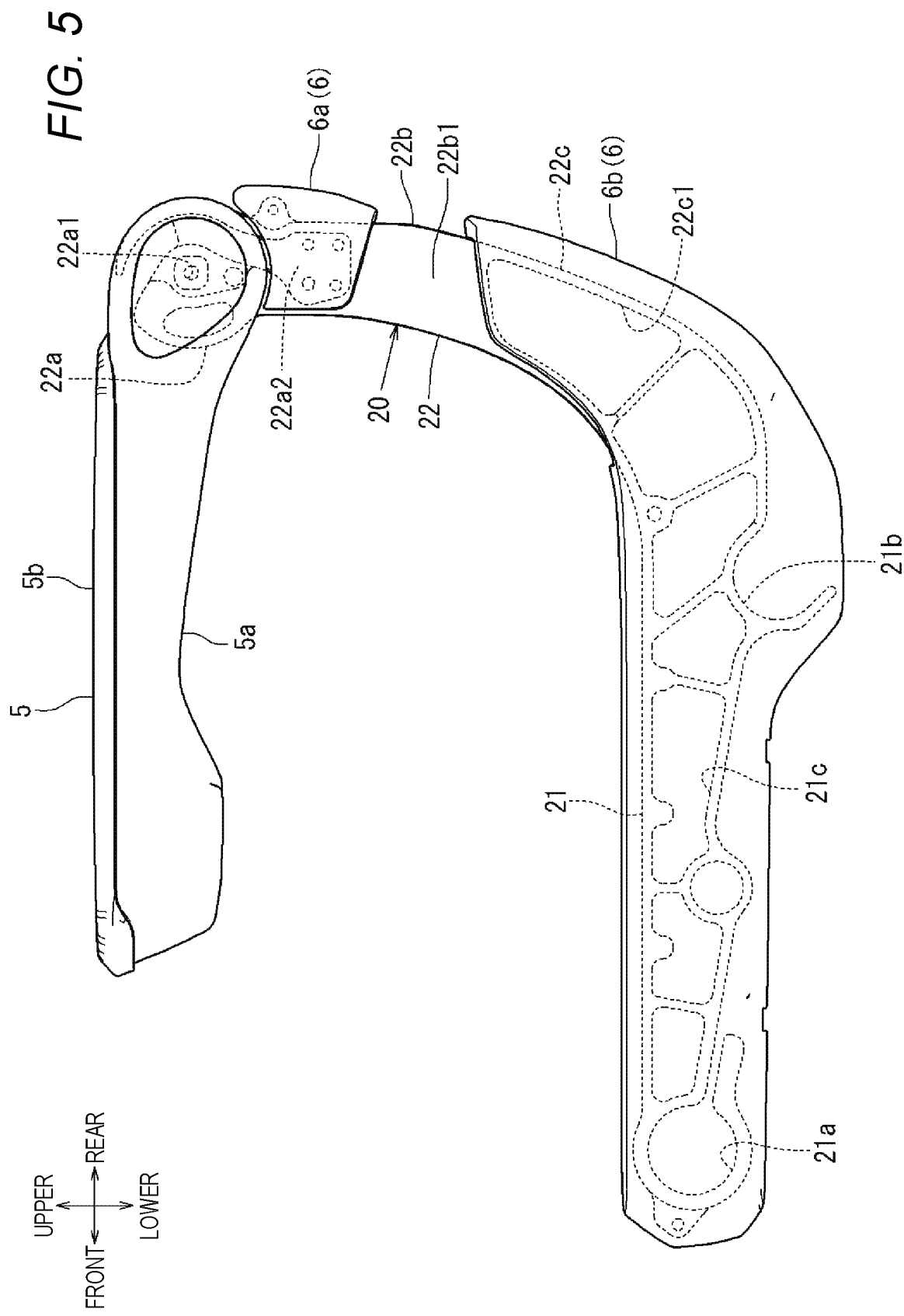
FIG. 5 is a side view of the aircraft seat according to the above embodiment when viewed from the outer side in the state where the seat cushion and the seat back are removed.
Figure 6:
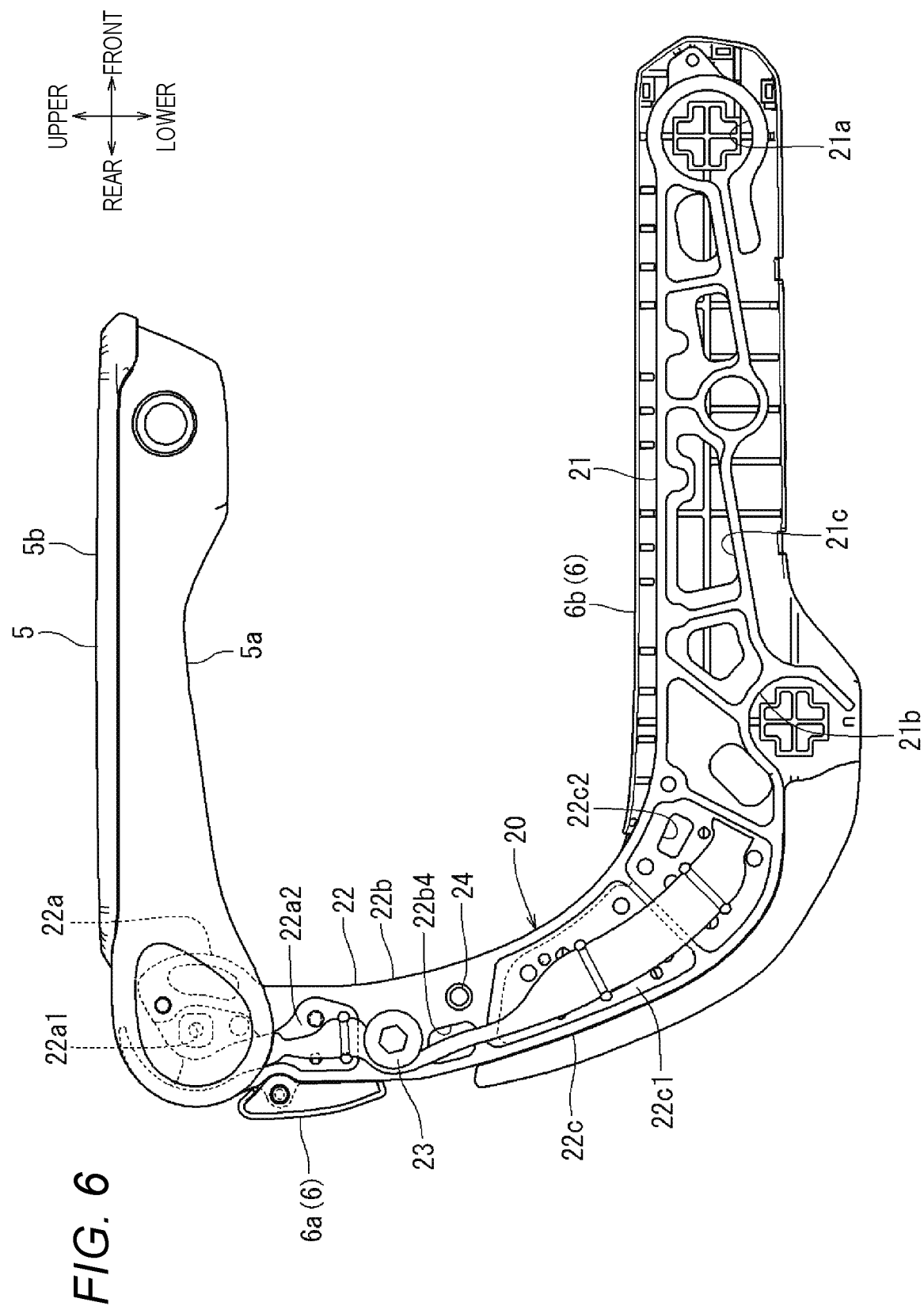
FIG. 6 is a side view of the aircraft seat according to the above embodiment when viewed from the inner side in the state where the seat cushion and the seat back are removed.

As shown in FIGS. 3 and 4, the cable device 7 has a structure in which the operation button 7a at one end and an operation mechanism 7b at the other end are connected by a control cable in which an inner cable passes through an outer pipe. When the operation button 7a is pressed, a cylinder device (not shown) is operated via the operation mechanism 7b to adjust an inclination angle of the seat back 4 with respect to the seat cushion 3. An upper end portion side of the cable device 7 is disposed in the main body portion 5a of the armrest 5, and the operation button 7a is attached so as to protrude rightward from the button hole 5a1. A portion of the cable in the cable device 7 below the rotation shaft of the armrest 5 is attached to a right side of the support member 20 in a state where a cable cover 7c is attached from the right side. Specifically, the cable cover 7c is made of resin, is formed in a shape opening leftward and extending in an upper-lower direction, and is fixed in a state of being disposed in the upper cable arrangement hole 22a2 and the lower cable arrangement hole 22c1 while covering a portion of the cable corresponding to the connecting portion 22 from the right side. A portion corresponding to the seat back pivot shaft attachment portion 22b is in contact with the right side surface of the seat back pivot shaft attachment portion 22b. A portion of the cable corresponding to the side portion 21 is hidden by the seat cushion 3 and the lower cover member 6b so as not to be visible from an outside. Here, the cable cover 7c corresponds to a "cable case".

As shown in FIGS. 3 to 6, the cover member 6 made of resin is attached to a portion of a left side surface of the support member 20, excluding the seat back pivot shaft attachment portion 22b, where a surface of the portion is not smooth, so as to prevent deterioration of an appearance. Specifically, a case-shaped upper cover member 6a opening rightward is attached by screw fastening to a portion below the armrest attachment portion 22a and above the seat back pivot shaft attachment portion 22b. The upper cover member 6a covers a left surface and a rear surface below the armrest attachment portion 22a. The case-shaped lower cover member 6b opening rightward is attached by screw fastening to the side portion 21 and the lower side portion 22c of the connecting portion 22 which is the lower side portion with respect to the seat back pivot shaft attachment portion 22b. The lower cover member 6b covers a left surface and a rear surface of the lower side portion 22c, and a left surface, a front surface, and a lower surface of the side portion 21 so as not to be visible from the outside. Here, the upper cover member 6a and the lower cover member 6b correspond to an "upper cover portion" and a "lower cover portion", respectively.

The present embodiment having the above configurations has the following effects. The left side surface (outer side surface in the seat width direction) of the seat back pivot shaft attachment portion 22b of the support member 20 is formed to be substantially smooth, and thus it is possible to prevent the deterioration of the appearance without being covered with the cover member 6. Accordingly, the cover member 6 can be implemented by two small cover members, that is, the upper cover member 6a covering an upper side with respect to the seat back pivot shaft attachment portion 22b and the lower cover member 6b covering a lower side with respect to the seat back pivot shaft attachment portion 22b, and thus the cover member can be reduced in size, and a seat weight can be reduced.

In the support member 20, the upper cable arrangement hole 22a2 is formed above the seat back pivot shaft attachment portion 22b, and the lower cable arrangement hole 22c1 is formed below the seat back pivot shaft attachment portion 22b. The cable of the cable device 7 is disposed in the upper cable arrangement hole 22a2 and the lower cable arrangement hole 22c1. Accordingly, the cable of the cable device 7 is less visible from the outside, and the deterioration of the appearance can be prevented.

Further, the cable of the cable device 7 is disposed in the upper cable arrangement hole 22a2 and the lower cable arrangement hole 22c1 in a state of being covered with the cable cover 7c from the right side. Accordingly, even if a part of the cable is exposed to the outside, the part of the cable is covered with the cable cover 7c, and thus the deterioration of the appearance can be further prevented.

Although a specific embodiment has been described above, the present invention is not limited to appearances and configurations in the embodiment, and various modifications, additions, and deletions may be made without changing the spirit of the present invention. Examples of embodiments include the following matters.

1. In the above embodiment, the cover member 6 is separated into two parts, that is, the upper cover member 6a and the lower cover member 6b. However, the present invention is not limited thereto, and when the outer side surface 22b1 corresponding to a lateral side of the seat back pivot shaft attachment portion 22b is exposed to the outside, the upper cover member 6a and the lower cover member 6b may be partially connected to each other to form a single component. In this case, attachment to the support member 20 can be facilitated while reducing a component weight.

2. In the above embodiment, the cable cover 7c is formed in the shape opening leftward and extending in the upper-lower direction. However, the present invention is not limited thereto, and the cable cover 7c may have a hollow pipe shape extending in an upper-lower direction and covering the cable of the cable device 7 from the left and right.

3. In the above embodiment, the aircraft seat 1 is the seat at the left end portion of the aircraft seat S in which a plurality of seats are arranged in the horizontal row in the left-right direction. However, the present invention is not limited thereto, and the aircraft seat 1 may be a single seat. Further, the present invention may be applied not only to the aircraft seat but also to a seat mounted on an automobile, a ship, a train, or the like.

What is claimed is:

1. A vehicle seat comprising:
a seat cushion;
a seat back;
an armrest provided on a lateral side of the seat back and extending in a front-rear direction of the vehicle seat;
a support member supporting the armrest; and
a cover member covering the support member from a lateral side of the vehicle seat, wherein
the support member includes a side portion extending in the front-rear direction along a lateral side of the seat cushion, and a connecting portion connecting a rear end portion of the side portion and a rear end portion of the armrest, and a pivot shaft attachment portion for attaching a pivot shaft supporting the seat back to be pivotable in the front-rear direction and extending in a left-right direction of the vehicle seat is formed on a part of the connecting portion in an upper-lower direction, and
the cover member includes an upper cover portion above the pivot shaft attachment portion and a lower cover portion below the pivot shaft attachment portion, and the upper cover portion and the lower cover portion are attached to the support member in a spaced-apart state such that a lateral side of the pivot shaft attachment portion having a substantially smooth surface is exposed at the lateral side of the vehicle seat.

2. The vehicle seat according to claim 1, wherein
a recess is formed on a surface of the support member except for the pivot shaft attachment portion, the surface being an opposite surface to the upper cover portion and the lower cover portion in the left-right direction, the recess being configured to accommodate a cable for adjusting an inclination of the seat back.

3. The vehicle seat according to claim 1, wherein
the recess is configured to accommodate a cable case which covers a part of the cable accommodated in in the recess.

4. The vehicle seat according to claim 1, wherein
the exposed lateral side of the pivot shaft attachment portion having the substantially smooth surface extends between the upper cover portion and the lower cover portion.

* * * * *